US011960305B2

(12) United States Patent
Oehring et al.

(10) Patent No.: US 11,960,305 B2
(45) Date of Patent: Apr. 16, 2024

(54) AUTOMATED BLENDER BUCKET TESTING AND CALIBRATION

(71) Applicant: U.S. Well Services, LLC, Houston, TX (US)

(72) Inventors: Jared Oehring, Houston, TX (US); Alexander Christinzio, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 128 days.

(21) Appl. No.: 17/136,937

(22) Filed: Dec. 29, 2020

(65) Prior Publication Data

US 2021/0200249 A1 Jul. 1, 2021

Related U.S. Application Data

(60) Provisional application No. 62/955,768, filed on Dec. 31, 2019.

(51) Int. Cl.
*E21B 43/26* (2006.01)
*G05D 11/13* (2006.01)

(52) U.S. Cl.
CPC ........ *G05D 11/132* (2013.01); *E21B 43/2607* (2020.05)

(58) Field of Classification Search
CPC .......................... E21B 43/2607; G05D 11/132
See application file for complete search history.

(56) References Cited

U.S. PATENT DOCUMENTS

| 2,976,025 | A | 3/1961 | Pro |
| 3,878,884 | A | 4/1975 | Raleigh |
| 4,411,313 | A | 10/1983 | Johnson et al. |
| 4,538,916 | A | 9/1985 | Zimmerman |

(Continued)

FOREIGN PATENT DOCUMENTS

| CN | 104117308 A | 10/2014 |
| CN | 104196613 A | 12/2014 |

(Continued)

OTHER PUBLICATIONS

Non-Final Office Action issued in U.S. Appl. No. 16/871,928 dated Aug. 25, 2021.

(Continued)

*Primary Examiner* — Paul J Gray
(74) *Attorney, Agent, or Firm* — Hogan Lovells US LLP

(57) ABSTRACT

A pump control system includes an additive pump, the additive pump being fluidly coupled to a component of a hydraulic fracturing system. The system also includes an additive container, the additive container configured to provide an additive to the additive pump via a flow path. The system further includes a diversion system, arranged within the flow path between the additive pump and the component of the hydraulic fracturing system, the diversion system configured to redirected at least a portion of additive directed toward the component of the hydraulic fracturing system. The system includes a calibration system configured to receive the redirected portion of the additive, the calibration system adapted to adjust one or more operational parameters of the additive pump responsive to an evaluation of a flow parameter of the redirected portion of the additive.

7 Claims, 4 Drawing Sheets

(56) References Cited

U.S. PATENT DOCUMENTS

| | | |
|---|---|---|
| 4,601,629 A | 7/1986 | Zimmerman |
| 4,768,884 A | 9/1988 | Elkin |
| 5,114,239 A | 5/1992 | Allen |
| 5,334,899 A | 8/1994 | Skybyk |
| 5,439,066 A | 8/1995 | Gipson |
| 5,486,047 A | 1/1996 | Zimmerman |
| 5,798,596 A | 8/1998 | Lordo |
| 5,813,455 A | 9/1998 | Pratt et al. |
| 5,950,726 A | 9/1999 | Roberts |
| 6,035,265 A | 3/2000 | Dister et al. |
| 6,097,310 A | 8/2000 | Harrell et al. |
| 6,121,705 A | 9/2000 | Hoong |
| 6,273,193 B1 | 8/2001 | Hermann et al. |
| 6,442,942 B1 | 9/2002 | Kopko |
| 6,585,455 B1 | 7/2003 | Petersen et al. |
| 6,788,022 B2 | 9/2004 | Sopko |
| 6,985,750 B1 | 1/2006 | Vicknair et al. |
| 7,795,830 B2 | 9/2010 | Johnson |
| 9,062,545 B2 | 6/2015 | Roberts et al. |
| 9,140,105 B2 | 9/2015 | Pattillo |
| 9,353,593 B1 | 5/2016 | Lu et al. |
| 9,506,333 B2 | 11/2016 | Castillo et al. |
| 9,790,858 B2 | 10/2017 | Kanebako |
| 9,945,365 B2 | 4/2018 | Hernandez et al. |
| 10,221,639 B2 | 3/2019 | Romer et al. |
| 10,408,030 B2 | 9/2019 | Oehring et al. |
| 10,408,031 B2 | 9/2019 | Oehring et al. |
| 10,415,332 B2 | 9/2019 | Morris et al. |
| 10,648,270 B2 | 5/2020 | Brunty et al. |
| 10,648,311 B2 | 5/2020 | Oehring et al. |
| 10,686,301 B2 | 6/2020 | Oehring et al. |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,988,998 B2 | 4/2021 | Fischer et al. |
| 2001/0000996 A1 | 5/2001 | Grimland et al. |
| 2004/0045703 A1 | 3/2004 | Hooper et al. |
| 2005/0201197 A1 | 9/2005 | Duell et al. |
| 2006/0109141 A1 | 5/2006 | Huang |
| 2008/0164023 A1 | 7/2008 | Dykstra et al. |
| 2008/0257449 A1 | 10/2008 | Weinstein et al. |
| 2008/0277120 A1 | 11/2008 | Hickie |
| 2009/0072645 A1 | 3/2009 | Quere |
| 2011/0081268 A1 | 4/2011 | Ochoa et al. |
| 2011/0110793 A1 | 5/2011 | Leugemores et al. |
| 2012/0063936 A1 | 3/2012 | Baxter et al. |
| 2012/0112757 A1 | 5/2012 | Vrankovic et al. |
| 2012/0150455 A1 | 6/2012 | Franklin et al. |
| 2013/0051971 A1 | 2/2013 | Wyse et al. |
| 2013/0284455 A1 | 10/2013 | Kajaria et al. |
| 2014/0174717 A1 | 6/2014 | Broussard et al. |
| 2015/0147194 A1 | 5/2015 | Foote |
| 2015/0233530 A1 | 8/2015 | Sandidge |
| 2016/0006311 A1 | 1/2016 | Li |
| 2016/0230660 A1 | 8/2016 | Zeitoun et al. |
| 2016/0305223 A1* | 10/2016 | Phillippi ................ F04D 13/12 |
| 2016/0326853 A1 | 11/2016 | Fred et al. |
| 2017/0082033 A1 | 3/2017 | Wu et al. |
| 2017/0096889 A1 | 4/2017 | Blanckaert et al. |
| 2017/0204852 A1 | 7/2017 | Barnett |
| 2017/0212535 A1 | 7/2017 | Shelman et al. |
| 2017/0370639 A1 | 12/2017 | Barden et al. |
| 2018/0090914 A1 | 3/2018 | Johnson et al. |
| 2018/0181830 A1 | 6/2018 | Luharuka et al. |
| 2018/0259080 A1 | 9/2018 | Dale et al. |
| 2018/0266217 A1 | 9/2018 | Funkhauser et al. |
| 2018/0284817 A1 | 10/2018 | Cook et al. |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0363640 A1 | 12/2018 | Kajita et al. |
| 2018/0366950 A1 | 12/2018 | Pedersen et al. |
| 2019/0040727 A1 | 2/2019 | Oehring et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0233275 A1* | 8/2019 | Carr .................... E21B 43/2607 |
| 2019/0249527 A1 | 8/2019 | Kraynek |
| 2019/0257462 A1 | 8/2019 | Rogers |
| 2020/0040878 A1 | 2/2020 | Morris |
| 2020/0325760 A1 | 10/2020 | Markham |
| 2020/0350790 A1 | 11/2020 | Luft et al. |

FOREIGN PATENT DOCUMENTS

| | | |
|---|---|---|
| CN | 112196508 A | 1/2021 |
| WO | 2009046280 | 4/2009 |
| WO | 2014177346 | 11/2014 |
| WO | 2018044307 A1 | 3/2018 |
| WO | 2018213925 A1 | 11/2018 |
| WO | 2019210417 | 11/2019 |

OTHER PUBLICATIONS

Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.

(56) References Cited

OTHER PUBLICATIONS

Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.

* cited by examiner

AUTOMATED BLENDER BUCKET TESTING AND CALIBRATION

CROSS REFERENCE TO RELATED APPLICATIONS

This application claims priority to and the benefit of U.S. Provisional Application Ser. No. 62/955,768 filed Dec. 31, 2019 titled "AUTOMATED BLENDER BUCKET TESTING AND CALIBRATION," the full disclosure of which is hereby incorporated herein by reference in its entirety for all purposes.

BACKGROUND

1. Technical Field

This disclosure relates generally to hydraulic fracturing and more particularly to systems and methods for regulating pumping operations.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

One feature present at fracturing sites is additive pumps, for example, that inject chemicals into various flow streams. These pumps are often smaller than fracturing pumps and may operate at lower pressures and/or temperatures, but it should be appreciated that operating conditions may be substantially similar to fracturing pumps in various embodiments. However, providing a desired amount of additive to flow streams may be important in maintaining operations. Typically, testing and/or calibration is performed manually with operators making judgment calls that flow rates are sufficient. When operators over estimate or under estimate rates, there may be operational upsets and down time to correct the error.

SUMMARY

Applicant recognized the problems noted above herein and conceived and developed embodiments of systems and methods, according to the present disclosure, for calibration systems.

Chemical pumps utilized with blenders are calibrated regularly to document and ensure accurate and proper flow of the chemicals used in the pumping process. Chemical pumps are sometimes referred to as liquid additive pumps, but it should be appreciated that embodiments of the present disclosure may be incorporated and used with all chemical pumps associated with hydraulic fracturing. Additive injection may use a variety of different pumps, such as progressive screw or progressive cavity pumps, positive displacement pumps, sometimes called Waukesha after a common manufacturer, and also dry additive delivery systems or any other method of delivering additives into the slurry system. This could be at the blender tub or at a different location. In general, calibration systems of the present disclosure consist of hardware and software used to self-diagnose pump efficiencies and make adjustments. These adjustments improve accuracy of the quantities of additives delivered to the various flow streams. The calibration systems may be applied mid-operation (e.g., on the fly) or in a designated calibration mode, which may run one or more tests automatically to establish desired flow rates. For example, during calibration, a calibration factor may be established for flow rate efficiencies. As a result, pumps may speed up or slow down minimally to dial actual flow rates into a specific set point. Embodiments may reduce time and human error associated with regular "bucket testing" or calibration of pumps, as well as reduce waste in the form of actual material being pumped during this calibration testing.

In various embodiments, a calibration system includes additional flow meters to be used as a reference or feedback loop to identify if flow is meeting a set target. For dry additive (or liquid chemical), a method to weigh the amount of product dispensed could also act as a reference to help identify inefficiencies. An algorithm or software may be used to automatically adjust pumps so that they reach closer rates to the designed dispense target. A form of display, read out, or print out may be generated to show the adjustments that were made for reference and documentation purposes.

Embodiments may be directed toward a calibration system that may, in part, divert a portion of a fluid flow into a flow loop to evaluate various parameters of the flow. For example, a flow rate and/or volume may be evaluated in the flow loop before diverting flow into a processing stream. Various valves, sensors, meters, and the like may be incorporated into the flow loop in order to evaluate one or more parameters of the fluid flow. Moreover, in embodiments, a software system may also be deployed to monitor and adjust flow rates. For example, the software system may receive information from sensors, determine a desired flow rate, adjust one or more flow properties, such as an injection rate or a valve position, and then continue to monitor process streams to evaluate whether additional adjustments would improve operating conditions. In various embodiments, adjustments may be tracked and recorded in order to document changes to the flow stream.

In an embodiment, a pump control system includes an additive pump, the additive pump being fluidly coupled to a component of a hydraulic fracturing system. The system also includes an additive container, the additive container configured to provide an additive to the additive pump via a flow path. The system further includes a diversion system, arranged within the flow path between the additive pump and the component of the hydraulic fracturing system, the diversion system configured to redirected at least a portion of additive directed toward the component of the hydraulic fracturing system. The system includes a calibration system configured to receive the redirected portion of the additive, the calibration system adapted to adjust one or more operational parameters of the additive pump responsive to an evaluation of a flow parameter of the redirected portion of the additive.

In an embodiment, a method for controlling a pumping operation includes causing an additive pump to direct an additive toward a hydraulic fracturing component. The method also includes diverting at least a portion of a flow stream away from the hydraulic fracturing component and toward a calibration system. The method further includes determining one or more properties of the flow stream. The method also includes determining the one or more properties exceed a threshold. The method includes adjusting one or more operational parameters of the additive pump.

In an embodiment, a calibration system includes a flow diverter positioned along a first flow path between a conveyance system and a component of a hydraulic fracturing system, the flow diverter configured to redirect at least a portion of a flow to a second flow path. The system also include a sensor positioned along the second flow path, the sensor configured to determine one or more properties of the flow. The system further includes a controller communicatively coupled to the sensor, the controller configured to output a control signal to the conveyance system responsive to the one or more properties of the flow.

BRIEF DESCRIPTION OF DRAWINGS

Some of the features and benefits of the present disclosure having been stated, others will become apparent as the description proceeds when taken in conjunction with the accompanying drawings, in which.

Figure 1:
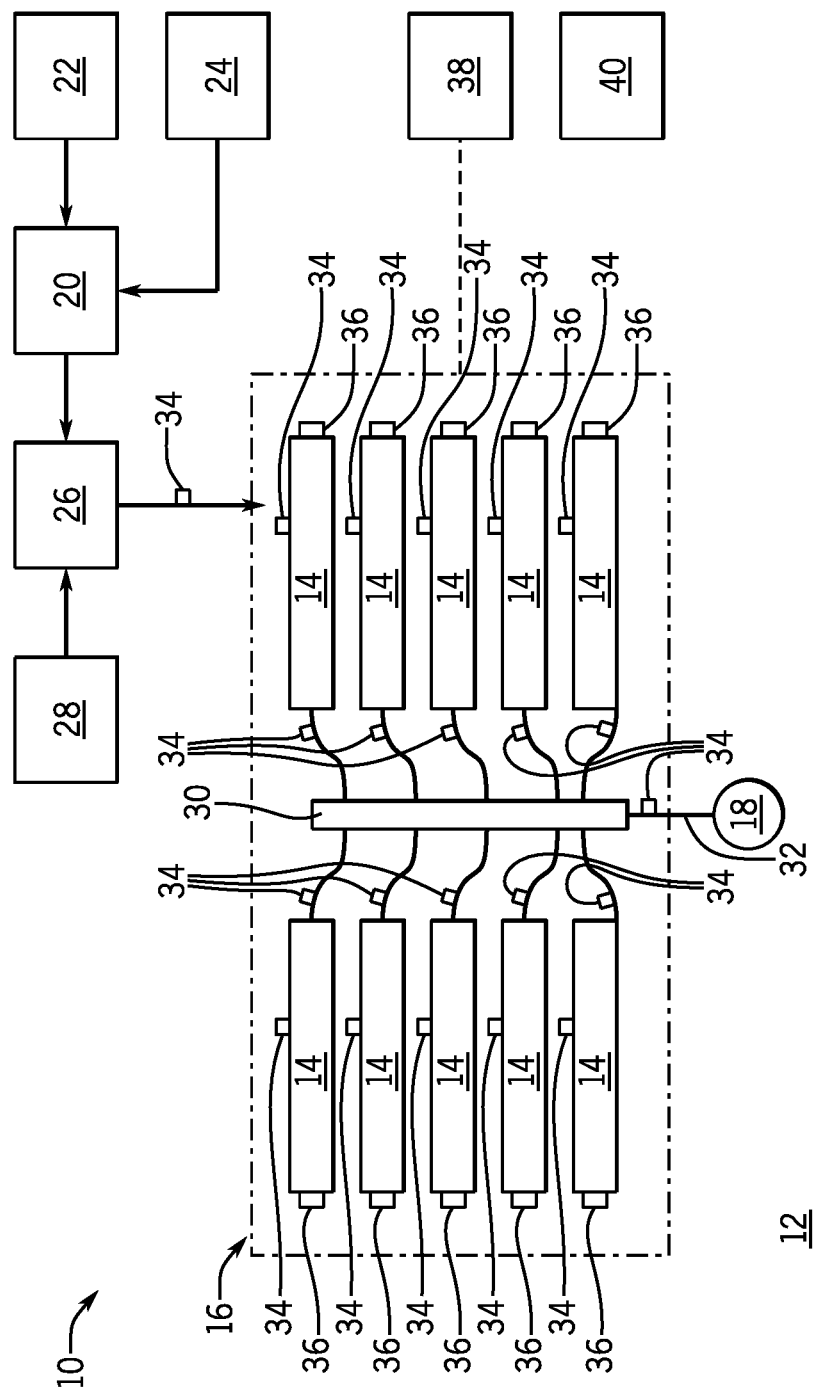
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure are directed toward calibration and adjustment of various additive pumps, which may also be referred to as chemical injection pumps, injection pumps, and the like. These pumps may be utilized in industrial applications, such as fracturing operations, to add liquid and/or dry additives to a flow stream. The additive systems may include pumps that inject a specified quantity into a flow stream. The disclosed calibration systems includes sensors and the like to monitor a flow rate or weight of injected additives and then adjust one or more properties of the injection systems (e.g., pumps, valves, etc.) in order to facilitate injection of a desired quantity of additives into the flow stream.

Embodiments may be incorporated into a variety of different components of fracturing operations, such as at a blender, hydration unit, or the like. For example, the calibration system may be associated with mixtures of chemicals such a cross-link, gel, friction reducers (FR), or high viscosity friction reducers (HVFR), with the purpose of the output being a different parameter other than pump efficiency, such as viscosity, pH, or other specifications. It should be appreciated that various embodiments may describe mixing and operation utilizing a blender, however, if a blender was to not be used and additives were injected into other low or high pressure locations, different methods for measuring additives may also be utilized, as will be described herein. In various embodiments, sand and other flow materials may also be measured, for example, by weighing the sand to track sand efficiencies.

Current methods manually check chemical pump efficiencies using a standard 5 gallon bucket. The operator sets a designated flow rate and then proceeds to fill a bucket with the fluid. A timer/stopwatch is used and at the end of a designated period of time, the amount of fluid in the bucket will be judged. From here, the operator will adjust efficiencies based on their opinion. Usually following an adjustment, an additional run is performed to check how the changes affected flow rates. As a result, the process is time consuming, if the adjustment is too small or too large, additional changes will be needed which will be followed by an additional run to check where the new rate lines up. Embodiments of the present disclosure offer improvements over subjective adjustments by operators by utilizing sensors and software applications to adjust flow rates based on measured quantities.

In various embodiments, the calibration system includes a flow loop or measuring bank in order to monitor and adjustment pumping operations prior to injecting additives into the system. By way of example involving a blender tub only, in operation systems and methods may include closing one or more valves to the blender tub and opening one or more valves to a measuring bank. This would divert flow coming out of chemical pumps to a predetermined location set up with proper hardware for measuring flow rates and or flow totals. As a result, one or more pumps may be tested simultaneously. This may be referred to as a calibration mode. In this calibration mode, the chemical pumps may be operable via a control system executing software configurations and begin to dispense fluid through the calibration system. Vessels could be used to hold the output of the fluid from each pump. As an example, flow meters may be used to determine if the target pump rates are achieved. However, it should be appreciated that flow meters are only one method, and other methods to measure target pump rates include, by are not limited to, other sensors such as, weight indicators, optical sensors, sonar sensors, floats, or other level detecting devices. The various sensors could be used individually or in conjunction with each other to determine how much fluid moves through the system. Based at least in part on the measurements from the one or more sensors, pump efficiency factors may self-regulate with an algorithm and an additional test may be performed for verification purposes. A read out, display or printed version could be produced to identify and indicate any changes or adjustments.

It should be appreciated that various embodiments may also include performing calibration checks while undergoing a pumping stage of the fracturing operation. Furthermore, in embodiments, the vessels receiving the output of the pumps may be evacuated and/or drained.

Advantageously, incorporation of the disclosed systems and methods provide methods for checking and adjusting chemical additive pump efficiencies, which may save time at the well site and reduce wasted chemicals from repeated testing.

FIG. 1 is a plan schematic view of an embodiment of a hydraulic fracturing system 10 positioned at a well site 12. In the illustrated embodiment, pumping units 14 (e.g., pump trucks), which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pumping units 14 may receive the slurry solution at a first pressure (e.g., 80 psi to 160 psi) and boost the pressure to around 15,000 psi for injection into the wellhead 18. In certain embodiments, the pumping units 14 are powered by electric motors.

After being discharged from the pump system 16, a distribution system 30, such as a missile, receives the slurry solution for injection into the wellhead 18. The distribution system 30 consolidates the slurry solution from each of the pump trucks 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like. In embodiments, the sensors 34, 36 transmit flow data to a data van 38 for collection and analysis, among other things. Furthermore, while not pictured in FIG. 1, there may be various valves distributed across the system. For examples, a manifold (not pictured) may be utilized to supply fluid to the pumping units 14 and/or to receive the pressurized fluid from the pumping units 14. Valves may be distributed to enable isolation of one or more components. As an example, there may be valves arranged to enable isolation of individual pumping units 14.

Furthermore, various support units may also include valves to enable isolation. As noted above, it may be desirable to isolate singular pumping units 14 or the like if operation upsets are detected. This would enable operations to continue, although at a lower rate, and may potential environmental or personnel hazards, as well as prevent increased damage to the components. However, during operations, personnel may be evacuated or otherwise restricted from entering a pressure zone. Embodiments of the present disclosure may enable remote operation of the valves and, in various embodiments, may enable electrical control using electric energy provided on site, such as through a generator or the like.

A power generation system 40 is shown, which may include turbines, generators, switchgears, transformers, and the like. In various embodiments, the power generation system 40 provides energy for one or more operations at the well site. It should be appreciated that while various embodiments of the present disclosure may describe electric motors powering the pumping units 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3 phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only to the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

In an embodiment, a small VFD paired with a dedicated electric motor rated for not more than 100 HP can be used to rotate the chemical additive pump, this motor and VFD can operate at voltages of 240V, 480V, 600V, 690V, or 720V. It should be appreciated that while embodiments may be described with reference to electric motors, in other embodiments, diesel prime movers and hydraulic pumps may also be utilized at the fracturing site, for example, to drive chemical additive pumps. For example, a large diesel engine can power an open or closed hydraulic system containing at least one hydraulic pump and one hydraulic motor to rotate a chemical additive pump. Both of these embodiments will be controlled by a software control system utilizing a user programmed P&ID loop and calibration factor used to help tune the accuracy of chemical flow rates and reactions to flow rate changes, as will be described below.

Figure 2:
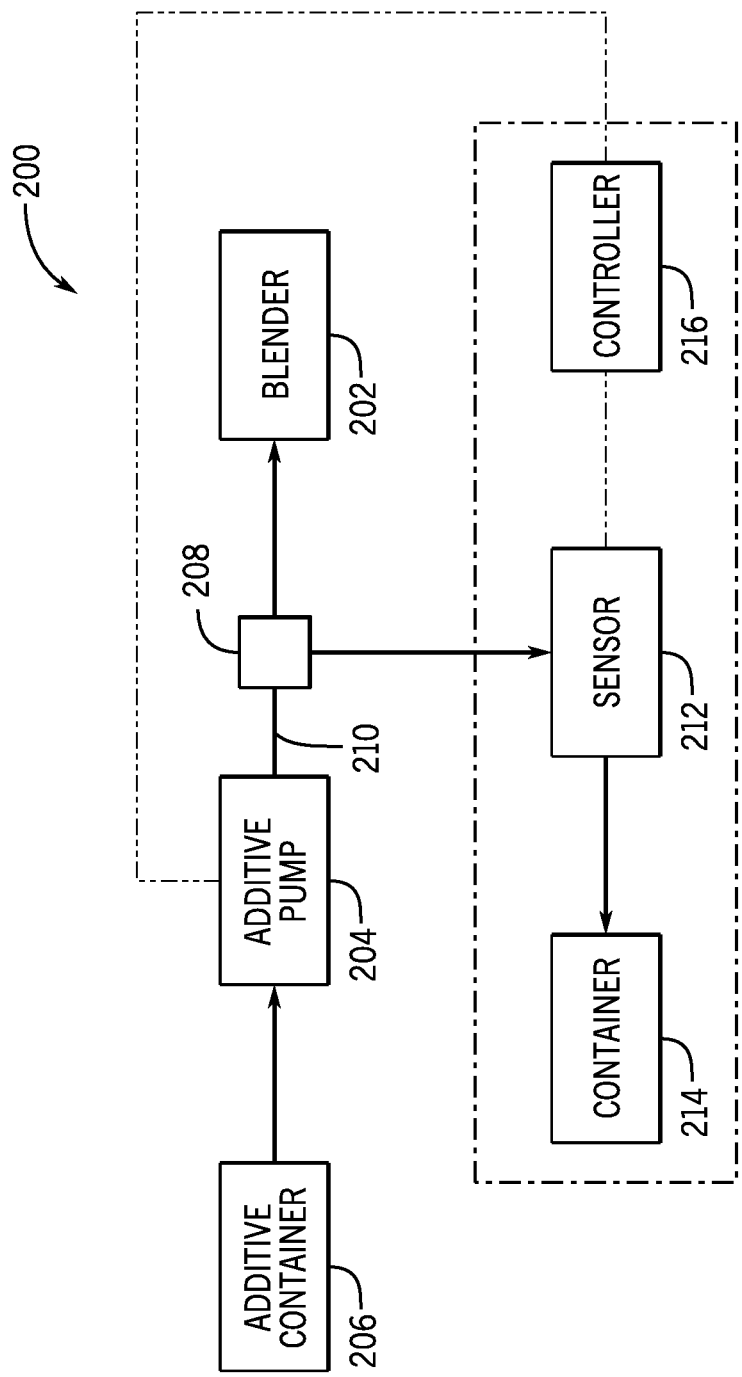
FIG. 2 is a block diagram of an embodiment of a calibration system for a fracturing operation, in accordance with embodiments of the present disclosure.

FIG. 2 is a schematic block diagram of an embodiment of a calibration system 200 coupled to a component 202 of a fracturing operation, which in this embodiment is a blender. It should be appreciated that various components have been removed for clarity and conciseness. Moreover, while the illustrated embodiment is shown using a blender, it should be appreciated that embodiments may be incorporated into other systems that also utilize chemical additives, such as hydration units and the like. Furthermore, it should be appreciated that while a single pump 204 is shown in the illustrated embodiment, multiple pumps may be incorporated to work with a single calibration system and/or the calibration system may include a variety of different containers, sensors, controllers, and the like in order to accommodate flow from a variety of different locations. Additionally, in various embodiments, the pump 204 may also be referred to as a conveyance system that may include a variety of different components, such as pumps, belt conveyors, hoppers, and the like to move materials such as liquids, solids, or combinations thereof toward the blender 202.

The illustrated embodiment includes an additive container 206 fluidly coupled to the additive pump 204 that directs additives to the blender 202. A diversion system 208 is incorporated into a flow line 210, which may include one or more valves that enables flow to be diverted from the blender and toward the control system. Moreover, the flow line 210 may include one or more flow paths that may be joined into a common flow path. In various embodiments, the diversion system 208 may include one or more pumps, which may be automatically or manually controlled, to divert flow toward a sensor 212 of the system 200. It should be appreciated that the diversion system 208 may be part of the system 200 and/or may be a separate component. As noted above, the sensor 212 may be a flow sensor to measures a rate of flow toward a container 214. However, in various embodiments, different sensors may also be incorporated, such as weight indicators, optical sensors, sonar sensors, floats, or other level detecting devices. The various sensors could be used independent or in conjunction with each other. By way of example only, the container 214 may include a level detecting device and flow rate may be determined by monitoring a change in the level over a period of time. Moreover, in various embodiments, multiple sensors may be utilized and may be compared to one other.

The system further includes a controller 216, which may receive information from the one or more sensors 212 and utilize the information to regulate operation of the pump 204. For example, the controller may compare a current flow rate to a target flow rate, determine the current flow rate is less than the target flow rate by a threshold amount, and then increase an operational parameter of the pump 204 in order to increase the flow rate. In this manner, parameters of the pump 204 may be tested prior to use and may be adjusted to provide a desired flow rate. That is, prior to injection of the additives into the blender 202, parameters may be tested and directed toward the container 214, thereby reducing the likelihood fan undesirable quantity of additive is provided to the blender 202. Moreover, the calibration may occur before operations, for example while equipment is being set up or during operations by redirecting a slip stream.

It should be appreciated that the description of the additive pump and additives are provided for illustrative purposes only and that various other embodiments may include different types of materials being added to the blender, such as sand, liquids, and the like. As an example, the blender 202 may include a tub that receives materials, such as sand and the like. In various embodiments, the additive container 206 may also be representative of a sand container with the additive pump 204 being representative of a sand conveyance system. The diverter system 208 may receive sand and a portion may be diverted to the container 214 where the sensor 212 may include a weight sensor to determine a quantity of sand provided to the container 214 over time. Accordingly, various types of material may be measured and evaluated using systems and methods of the present disclosure.

Figure 3:
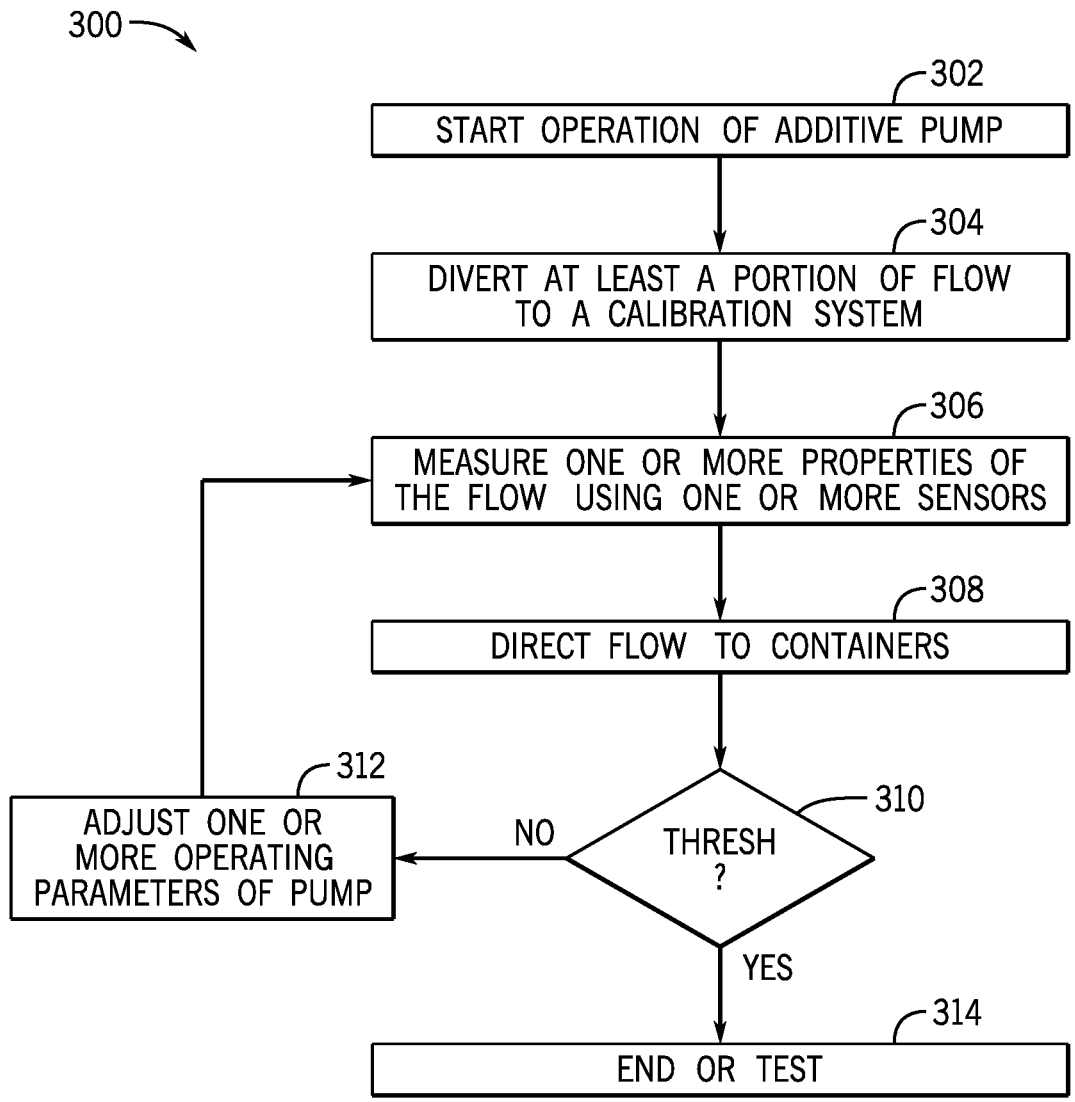
FIG. 3 is a flow chart of an embodiment of a method for calibrating an additive injection pump, in accordance with embodiments of the present disclosure.

FIG. 3 is a flow chart of an embodiment of a method 300 for testing operational parameters of an additive injection system. It should be appreciated that the method may include more or fewer steps and that the steps may be performed in any order or in parallel, unless otherwise specifically stated. This example begins by starting operation of an additive pump 302. As noted above, the pump may be manually operated or may be automatically started, for example during a calibration mode. At least a portion of flow from the pump is diverted to a calibration system 304. For example, a diversion system may regulate operation of one or more valves to direct flow toward the calibration system. The calibration system may include one or more sensors to measure one or more properties of the flow, such as a flow rate or the like 306.

The flow may be received at a container 308 and the one or more properties may be evaluated against a threshold 310. For example, the threshold may be a predetermined amount that differs from a desired or set point of operation for the additive pump. The threshold may be adjustable and may be particularly selected to reduce how often adjustments are made. If the current properties are above or below the threshold, one or more operating parameters of the pump may be adjusted 312. For example, if a flow rate is too high the pump may be adjusted to reduce the flow rate or a valve may be throttled to reduce how much additive is directed toward the blender.

If the flow rate is within the threshold, then the method may end or testing may continue 314.

Figure 4:
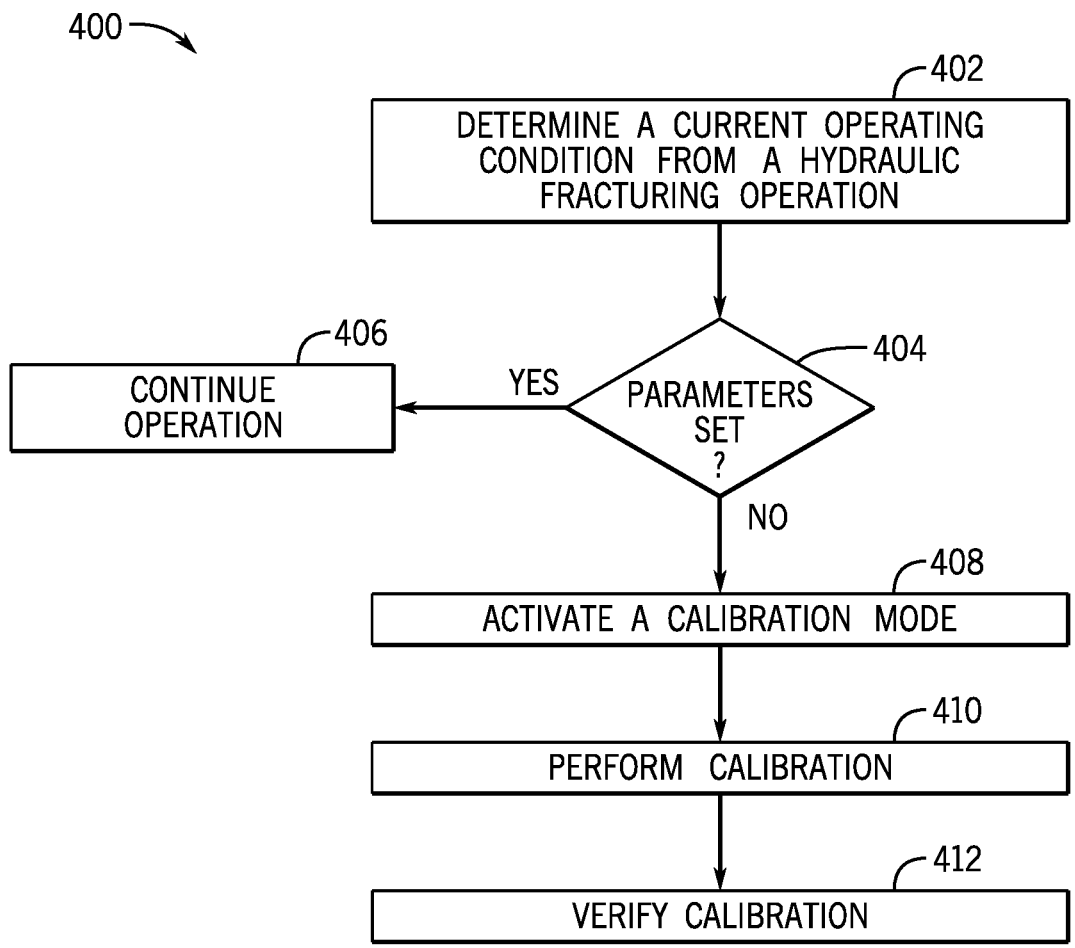
FIG. 4 is a flow chart of an embodiment of a method for monitoring an operating condition, in accordance with embodiments of the present disclosure.

Embodiments of the present disclosure may also be directed toward establishing different modes of operation for one or more components of the fracturing operation. FIG. 4 is a flow chart of an embodiment of a method 400 for selecting an operational mode for a fracturing operation. In this example, a current operating condition is determined 402. For example, the operating condition may include start up, a new fracturing stage, or the like. In certain embodiments, different operating conditions may have corresponding modified operating conditions. As an example, if a particle size of fracturing sand is being changed, pumps may operating at different speeds and/or additives being provided to the blender may change. Accordingly, a determine is made whether parameters are set 404. If parameters are set, for example in a situation where the operating condition corresponds to an operating that has already begun and/or has been calibrated, the operation continues 406. If the parameters have not been set, a calibration mode is activated 408. The calibration mode may be set manually or automatically. For example, a controller may receive a signal indicative of a start up or shut down, which may provide information regarding whether an operation is beginning or ending. Calibration may then be performed 410. As noted above, calibration may lead to determining one or more flow properties and making adjustments. The calibration may then be verified 412, for example, by testing operations for a period of time after calibration. In this manner, operations may be monitored and controlled.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

We claim:

1. A pump control system, comprising:
    an additive pump, the additive pump being fluidly coupled to a component of a hydraulic fracturing system;
    an additive container, the additive container configured to provide an additive to the additive pump;
    a diversion system, arranged within a flow path between the additive pump and the component of the hydraulic fracturing system, comprising:
        a first separate flow path coupled to the component of the hydraulic fracturing system, and
        a second separate flow path, wherein at least a first portion of the additive entering the diversion system is directed along the first separate flow path and at least a second portion of the additive entering the diversion system is directed along the second separate flow path; and
    a calibration system configured to receive at least the second portion of the additive via the second separate flow path, the calibration system adapted to adjust one or more operational parameters of the additive pump responsive to an evaluation of a flow parameter of at least the second portion of the additive.

2. The pump control system of claim 1, further comprising:
    a container positioned to receive at least the second portion of the additive from the second separate flow path.

3. The pump control system of claim 1, further comprising:
    a controller of the calibration system, the controller being communicatively coupled to the additive pump to regulate one or more operational parameters of the additive pump.

4. The pump control system of claim 3, wherein the controller is further communicatively coupled to the diversion system.

5. The pump control system of claim 1, wherein the diversion system includes one or more valves to redirect at least the second portion of the additive along the second separate flow path to the calibration system.

6. The pump control system of claim 1, wherein the component of the hydraulic fracturing system is a blender.

7. The pump control system of claim 1, wherein the calibration system is initialized prior to a fracturing operation.

* * * * *